United States Patent [19]

Gantzer

[11] Patent Number: 5,548,949
[45] Date of Patent: Aug. 27, 1996

[54] HAY MAKING MACHINE WITH CARRYING WHEELS

[75] Inventor: Christian Gantzer, Dannelbourg, France

[73] Assignee: Kuhn S.A., Saverne Cedex, France

[21] Appl. No.: 433,969

[22] Filed: May 4, 1995

[30] Foreign Application Priority Data

May 4, 1994 [FR] France .................... 94 05655

[51] Int. Cl.⁶ .................................................. A01D 78/12
[52] U.S. Cl. .................... 56/367; 56/377; 56/384
[58] Field of Search ............................ 56/367, 366, 376, 56/377, 380, 384, 396, 370

[56] References Cited

FOREIGN PATENT DOCUMENTS

| | | |
|---|---|---|
| 0415301 | 3/1991 | European Pat. Off. .................. 56/367 |
| 0508200A1 | 3/1992 | European Pat. Off. . |
| 0614604A1 | 3/1994 | France . |
| 8811010 U | 3/1988 | Germany . |
| 9004189 U | 4/1990 | Germany . |
| 40 33 526.7 | 10/1990 | Germany . |
| 4027025 | 3/1991 | Germany .................... 56/367 |

*Primary Examiner*—Terry Lee Melius
*Attorney, Agent, or Firm*—Oblon, Spivak, McClelland, Maier & Neustadt, P.C.

[57] ABSTRACT

A hay making machine including a carrying structure which can be attached to a tractor such that the carrying structure can travel with the tractor in a forward direction. A substantially vertical support axle is mounted to the carrying structure and supports a rotor having hay making tools. A girder is attached to the support axle. A support structure is articulated to the girder via one substantially vertical pivot spindle positioned forward of the support axle. Two beams, each carrying two carrying wheels, are connected to the support at opposite sides. At curves and turns of the trajectory of the tractor, all of the carrying wheels will pivot together with their beams and the support structure around the pivot spindle. The wheels will therefore be oriented together, without skidding, in the forward direction.

11 Claims, 2 Drawing Sheets

HAY MAKING MACHINE WITH CARRYING WHEELS

BACKGROUND OF THE INVENTION

1. Field of the Invention

This invention pertains to a hay making machine, especially a fodder swather, which includes a carrying structure that can be connected to a tractor, the structure supporting at least one rotor which can turn about a support axle which is approximately vertical, and to which two beams are connected, with each one having two carrying wheels.

2. Description of the Related Art

On a machine of this kind the beams allow one to reduce the extent of the displacements transmitted to the rotor when the carrying wheels pass over uneven places. Consequently, said rotor adapts better to the surface of the ground and can be displaced at greater speed.

However, during turns the wheels skid over the ground. They are then subjected to considerable wear and they can damage the vegetation on the surface of the ground. This skidding arises from the fact that they are offset with respect to one another in the direction of advance. To remedy this it has been proposed to make one or both carrying wheels of each pair pivot with respect to their beam about approximately vertical axes. In this case the beam must be located above one or both pivoting carrying wheels so that they can have room to turn about said axes. However, because the height available under each rotor is limited by the hub and/or the tool carrying arms of this rotor, it is only possible to use pivot-mounted wheels having a small diameter. Such wheels do not move as well over irregular ground and are not suitable to be used on large-size machines. In addition, in order to make these wheels pivot-mounted it is necessary to mount each one on an arm which must be articulated on the corresponding beam. Such implementation is relatively complicated and expensive.

Moreover, the pivot-mounted wheels easily deviate from their trajectory when they meet obstacles. It might happen, therefore, that the carrying wheels which are arranged under the same rotor are not always oriented in the same direction. In this case they skid or slide along the ground and destabilize the machine.

SUMMARY OF THE INVENTION

It is an object of the present invention to provide a machine which does not have the aforementioned disadvantages.

It is a further object of the present invention to provide a machine in which the mounting of the carrying wheels is simple and allows them to be oriented correctly in turns.

It is yet a further object of the present invention to provide a machine having improved stability.

The above and other objects are achieved according to the invention by providing that the two beams which carry the transport wheels are connected to one and the same support, and that this support is itself articulated on a girder which is solidly attached to the support axle of the rotor, by means of a single approximately vertical spindle which is located in front of said support axle.

By means of this structure all of the carrying wheels pivot together around the approximately vertical spindle during turns. They thus orient perfectly according to the trajectory of the tractor. This method of implementation requires only a single approximately vertical spindle for all the carrying wheels of the rotor, which simplifies the construction. It further allows one to use carrying wheels having a large diameter. Finally, none of these wheels deviates from its trajectory when it meets an obstacle.

According to another characteristic of the invention, the girder which is solidly attached to the support axle of the rotor comprises an abutment against which the support structure of the carrying wheels rest. This abutment is preferably located between the approximately vertical spindle of the support of the carrying wheels and the support axle of the rotor. This arrangement allows one to limit the stresses, especially bending stresses, which are exerted on said vertical spindle. The rigidity of the wheel support is also improved. One will thereby obtain better stability of the supporting assembly without having to increase the dimensions or to reinforce the parts which constitute it, which would otherwise result in an increase of their weight and cost.

BRIEF DESCRIPTION OF THE DRAWINGS

Other characteristics and advantages of the invention will be apparent from the following description of an example of non-limiting implementation of the invention, with references given to the attached drawings in which.

DETAILED DESCRIPTION OF THE PREFERRED EMBODIMENT

Figure 1:
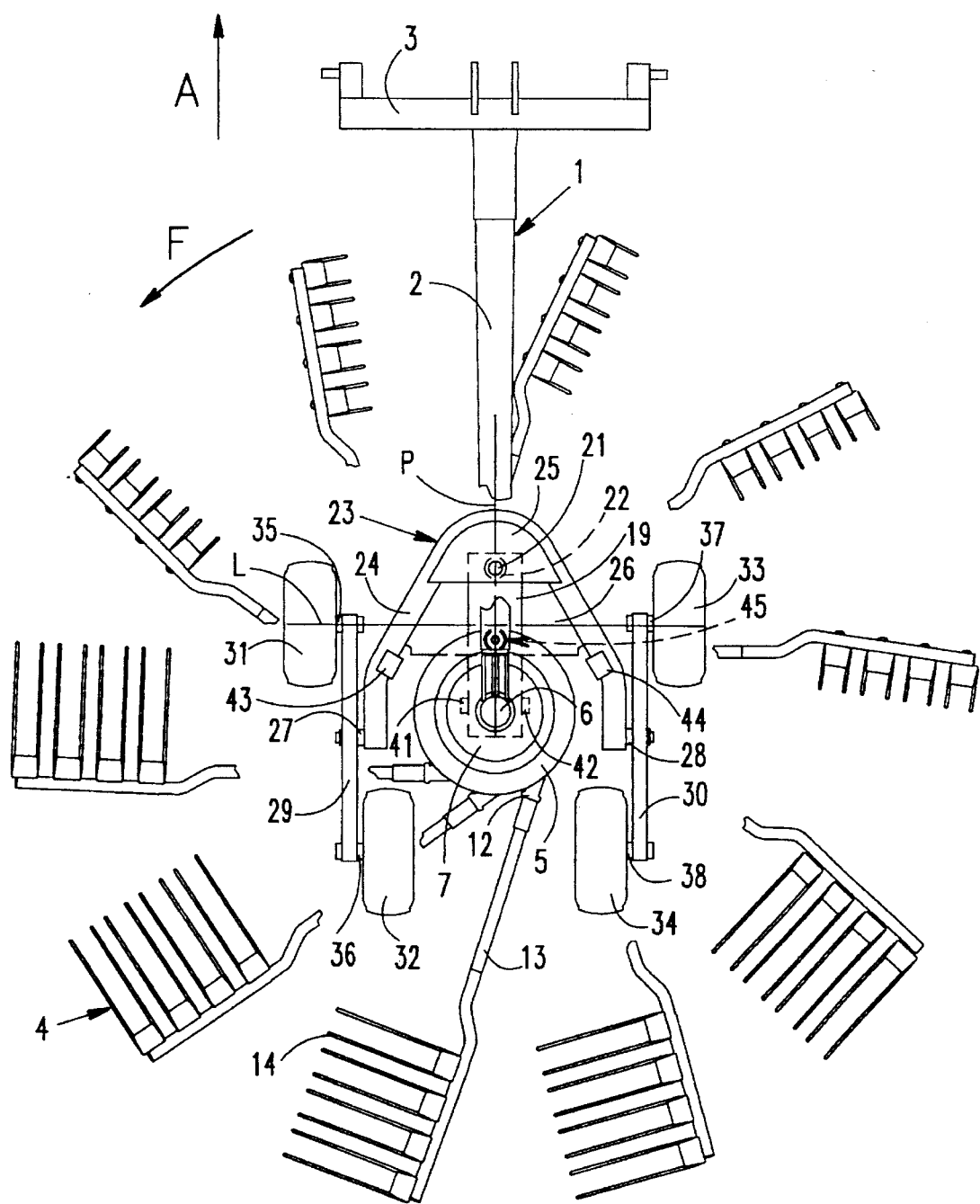
FIG. 1 shows a simplified top view of a machine in accordance with the invention.
Figure 2:
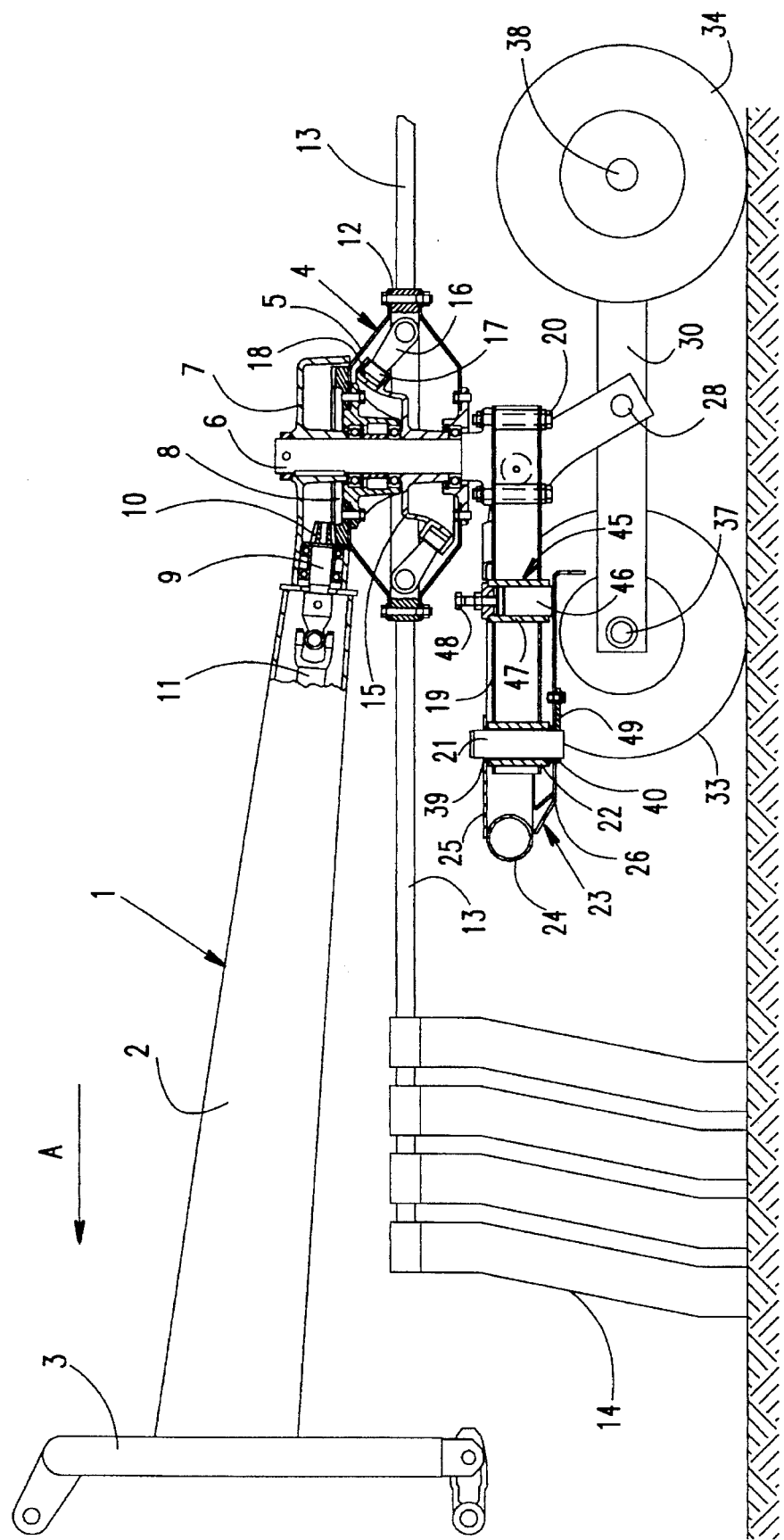
FIG. 2 shows a side view with a partial cut-away view of the machine of FIG. 1.

As shown in FIGS. 1 and 2, the machine in accordance with the invention includes a supporting structure (1). The latter consists of a girder (2) which bears at its forward end a three-point coupling arrangement (3) for connection to a drive tractor which is not shown. The other end of the girder (2) carries a rotor (4) which is used to swath products such as cut grass lying on the ground. Said rotor (4) has a box or case (5) mounted so as to be able to turn about an approximately vertical support axle (6). This support axle (6) is secured at its upper end in a bearing of a protective cap (7) which is itself attached to the girder (2). Inside this protective cap (7) there is a toothed crown (8) which is solidly attached to the box (5), e.g., with screws. In the part of the protective cap (7) which is directed toward the girder (2) there is a transmission shaft (9) having a pinion (10) which meshes with the toothed crown (8). This transmission shaft (9) can be connected to the tractor power take-off shaft by means of intermediate shafts (11) for the purpose of driving box (5) of the rotor (4) in rotation.

The box (5) is provided with bearings (12) through which arms (13) pass. The latter extend in the form of spokes and bear at their outer ends work tools (14) such as forks. The arms are housed in said bearings (12) in such a manner that they can turn about their longitudinal axes. On the part of the support axle (6) located in the casing (5) is mounted a fixed cam (15) which is intended to control the tool-carrying arms (13) during operation. For this purpose each arm (13) has at its end, which extends inside the casing (5), a lever (16) with a roller wheel (17) which is guided into a groove (18) of the cam (15). The guidance of each roller wheel in its groove causes the rotation of the respective arm about its longitudinal axis.

The lower end of the support axle (6) is located under the casing (5). A girder (19) or a similar piece is attached to this end of the support axle by means of screws or bolts (20). This girder (19) is directed in the direction (A) of advance of the machine. It has a rectangular shape and is preferably hollow. This girder includes one approximately vertical pivot spindle (21). This pivot spindle (21) is housed in a tube (22) which is solidly attached to the girder (19). It is located in front of the support axle (6) of the rotor (4), approximately in a same plane (P) which is directed in the direction (A) of advance.

A support (23) is articulated on the pivot spindle (21) in such a manner as to be able to turn in an approximately horizontal plane. This support (23) consists of a curved tube (24) and two approximately horizontal plates (25 and 26) which are soldered to said tube (24). These plates (25 and 26) are located one above the other on either side of the girder (19). Each one includes an opening (39, 40) through which the pivot spindle (21) passes. The latter is provided with a clip (49) which allows one to attach it to the plate (26).

Each end of the tube (24) has an approximately horizontal articulation axle (27, 28). On each of these axles (27 and 28) is mounted a beam (29, 30) with two carrying wheels (31 and 32, 33 and 34) which are offset with respect to one another in the direction (A) of advance and are located under the rotor (4). Each of these carrying wheels (31 to 34) turns on a spindle (35 to 38) arranged near one of the ends of the respective beams (29 and 30). The two spindles (35 and 36 or 37 and 38) of the same beam (29 or 30) are located at approximately equal distances from the corresponding articulation axle (27 or 28). The pivot spindle (21) of the support (23) on the girder (19) is located in front of a line (L) which passes through the spindles (35 and 37) of the most forward wheels (31 and 33) of the two beams (29 and 30).

The girder (19) includes on each of its lateral sides a stop piece (41, 42) to limit the displacements of the support (23) about the pivot spindle (21). For this purpose each branch of the tube (24) includes a blocking clip (43, 44) which is directed toward one of said stops (41 and 42) and which can engage one of the stops when the angular displacement of the support (23) is a maximum.

The girder (19) includes an abutment (45) against which the support (23) rests when the machine is resting on the wheels (31 to 34). This abutment (45) is located between the approximately vertical pivot spindle (21) and the support axle (6) of the rotor (4). It consists of a buffer (46) made of plastic. This buffer (46) is inserted in a tube (47) which is approximately vertical and solidly attached to the girder (19). The position of the buffer (46) in the tube (47) is adjustable by means of a screw (48) which pushes on its upper end. It can thereby be displaced downward until it comes in contact with the plate (26) of the support (23). Because it is made of plastic this improves sliding on said plate (26).

The articulation axles (27 and 28) of the beams (29 and 30) can be displaced heightwise on the tube (24) of the support (23). This allows one to vary the spacing of the rotor (4) with respect to the ground.

The invention also pertains to a machine with two rotors (4) such as described previously. In this case the rotors (4) are arranged on the sides of a common carrying structure.

During operation, the machine according to FIGS. 1 and 2 is displaced on the ground in the direction (A) of advance by means of a tractor to which coupling arrangement (3) is connected. The rotor (4) is then driven to rotate in the direction (F) about the support axle (6) by the power take-off shaft of said tractor. During this rotation the cam (15) controls the tool-carrying arms (13), through the intermediary of levers (16) and roller wheels (17), so that they displace their tools (14). Thus, on the forward part of their trajectory these tools (14) are approximately vertical and pick up the products lying on the ground. Subsequently, on the lateral part of their trajectory, the tools (14) are raised so that they deposit the gathered products in the form of a swath. Finally, said tools (14) return gradually to the gathering position on the rear part of their trajectory.

During this operation the wheels (31 to 34) roll over the ground and support the rotor (4). When they pass over uneven places they pivot with the corresponding beam (29 or 30) about the articulation axle (27 or 28) of the latter. The height displacements of the wheels (31 to 34) are then greater than displacements of the corresponding beam (29, 30) at the level of its articulation axle (27, 28). For this reason the displacements of the rotor (4) are smaller. The latter is then more stable and can move forward at greater speed. On the other hand, at curves and turns of the trajectory followed by the tractor and the machine, all of the carrying wheels (31 to 34) pivot together with their beams (29 and 30) and the support (23) around the approximately vertical pivot spindle (21) of the latter. Said wheels (31 to 34) therefore orient together, without skidding, in the direction (A) of advance. They are no longer able to deviate separately from their trajectory. The pivoting movements about the pivot spindle (21) are limited by means of the stops (41 and 42), especially in order to prevent the carrying wheels (31 to 34) from entering the trajectory of the tools (14).

When the carrying wheels (31 to 34) of the machine rest on the ground, the support (23) leans against the abutment (45) of the girder (19). For this reason, stresses on the pivot spindle (21) are relieved and the rigidity of the support (23) is improved.

In the case where the machine includes two rotors (4), the carrying wheels provided under the latter orient in the same manner as those already described.

It is quite evident that the invention is not limited to the method of implementation as described previously and shown in the attached drawings. Some modifications are possible, especially pertaining to the make-up of the different elements or by substitution of engineering equivalents, without, however, departing from the protected scope of the invention.

What is claimed as new and is desired to be secured by Letters Patent of the United States is:

1. A hay making machine comprising:

a carrying structure which can be connected to a tractor such that the carrying structure can travel with the tractor in a direction of advance;

a substantially vertical support axle mounted to said carrying structure and supporting a rotor having hay making tools;

a girder attached to said support axle;

a support structure articulated to said girder by means of one substantially vertical pivot spindle positioned forward of said support axle relative to the normal direction of advance; and two beams, each of said beams carrying two carrying wheels, said beams being connected to said support structure at opposite sides.

2. The machine of claim 1 wherein said support axle of the rotor and said pivot spindle are both located in a same substantially vertical plane which is directed in the direction of advance.

3. The machine of claim 1 wherein said carrying wheels on each of said beams comprise wheels spaced in the direction of advance, and wherein said pivot spindle is located forward relative to the normal direction of advance of a line passing through the spindles of forewardmost ones of said carrying wheels of said two beams.

4. The machine of claim 1 wherein said beams are articulated on the said support structure by means of substantially horizontal axles.

5. The machine of claim 1 including stop means for limiting angular displacement of said support structure about the pivot spindle.

6. The machine of claim 5 wherein said stop means include two stop pieces located on said girder.

7. The machine of claim 1 wherein said girder includes an abutment against which rests said support structure of the carrying wheels.

8. The machine of claim 7, wherein said abutment is located on said girder between said approximately vertical pivot spindle and said support axle of the rotor.

9. The machine of claim 8, wherein the position of said abutment is adjustable.

10. The machine of claim 7, wherein said abutment comprises a plastic buffer.

11. The machine of claim 1, wherein said support structure comprises a curved tube and two approximately horizontal plates respectively mounted above and below said tube.

* * * * *